United States Patent [19]
Ellestad et al.

[11] 3,856,939
[45] Dec. 24, 1974

[54] ANTIBIOTIC BL869 β AND METHOD OF PREPARATION

[75] Inventors: George Alfred Ellestad, Pearl River; John Henry Edward James Martin, New City, both of N.Y.; John Norman Porter, Ramsey, N.J.

[73] Assignee: American Cyanamid Company, Stamford, Conn.

[22] Filed: Sept. 17, 1973

[21] Appl. No.: 398,283

[52] U.S. Cl. .................................. 424/116, 195/80
[51] Int. Cl. ............................................ A61k 21/00
[58] Field of Search ...................... 424/116; 195/80

[56] References Cited
UNITED STATES PATENTS
3,678,159   7/1972   Niida et al. ........................ 424/116

Primary Examiner—Jerome D. Goldberg
Attorney, Agent, or Firm—Edward A. Conroy, Jr.

[57] ABSTRACT

This disclosure describes a new antibiotic, designated BL869β, produced in a microbiological fermentation under controlled conditions using a new strain of an undetermined species of the genus *Streptomyces*.

3 Claims, 2 Drawing Figures

FIG. 1  INFRARED ABSORPTION SPECTRUM OF ANTIBIOTIC BL869β HYDROCHLORIDE IN KBr

PROTON MAGNETIC RESONANCE SPECTRUM OF ANTIBIOTIC BL869β HYDROCHLORIDE IN DEUTERATED DIMETHYLSULFOXIDE

ANTIBIOTIC BL869 β AND METHOD OF PREPARATION

BRIEF SUMMARY OF THE INVENTION

This invention relates to a new antibiotic designated BL869β and to its production by fermentation, to methods for its recovery and concentration from crude solutions, and to processes for its purification. The present invention includes within its scope the antibiotic in dilute form, as a crude concentrate, and in pure crystalline form. The effects of the new antibiotic on specific organisms, together with its chemical and physical properties, differentiate it from previously described antibacterial agents.

DETAILED DESCRIPTION OF THE INVENTION

Figure 1:
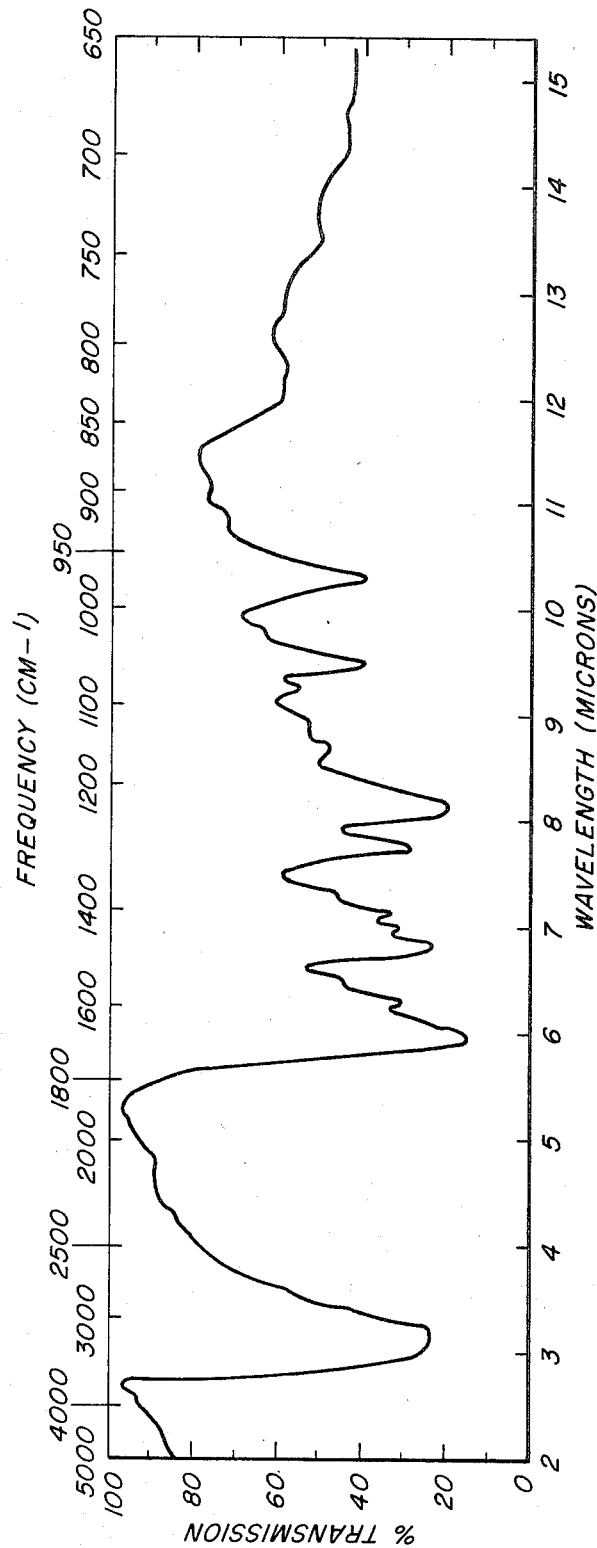

The new antibiotic which we have designated BL869β is formed during the cultivation under controlled conditions of a new strain of an undetermined species of the genus *Streptomyces*. This new antibiotic producing strain was isolated from a praire soil sample collected near Worthington, Minnesota. A viable culture of the new microorganism has been deposited with the Culture Collection Laboratory, Northern Utilization Research and Development Division, United States Department of Agriculture, Peoria, Ill., and has been added to its permanent collection. It is freely available to the public in this depository under its accession number NRRL 5750.

The description and identification of this new microorganism, maintained in the culture collection of the Lederle Laboratories Division, American Cyanamid Company, Pearl River, N.Y. as Culture No. BL869, was supplied by Dr. H.D. Tresner of these laboratories. The following is a general description of the microorganism *Streptomyces sp.* NRRL 5750, based on diagnostic characteristics observed. Observations were made of the cultural, physiological and morphological features of the microorganism in accordance with the methods detailed by Shirling, E.B. and Gottlieb, D., International Journal of Systematic Bacteriology, 16, 313–340, (1966). The chemical composition of the culture was determined by the procedures given by Lechavalier, H.A., Lechevalier, M.P. and Gerber, N.N., Advances in Applied Microbiology, 14, 47–72, (1971). The underscored descriptive colors and color chip designations are taken from Jacobsen, E. et al., Color Harmony Manual, 3rd Edition, Container Corporation of America, Chicago, Illinois (1948). Descriptive details are recorded in Tables I–IV below.

Amount of Growth:
  Moderate to good on most media; light on Czapek's solution agar.

Aerial Mycelium:
  Aerial mycelium whitish to grayish-white when present and then only in trace amounts.

Soluble Pigments:
  Soluble pigments yellowish brown to brownish; heavy on Hickey and Tresner's, Kuster's oatflake, Tomato paste-oatmel, and Weinstein's agars.

Reverse Color:
  Yellowish to dark brown shades on most media.

Miscellaneous Physiological and Chemical Determinations

Complete liquefaction of gelatin in 7 days; nitrates reduced to nitrites in 7 days; complete peptonization on purple milk; no melanin pigments produced; NaCl tolerance ≧ 10% but < 13%; cell wall analysis showed L-diaminopimelic acid present. Carbon source utilization, according to the method of Pridham, T.G. and Gottlieb, D., Journal of Bacteriology, 56, 107–114, (1948), as follows: Good utilization of l-arabinose, galactose, d-fructose, i-inositol, lactose, d-mannitol, d-melibiose, d-raffinose, salicin, d-trehalose, d-xylose and dextrose; no utilization of d-melezitose, l-rhamnose and sucrose.

Micromorphology

Aerial mycelium sparse, giving rise to an occasional spore chain. Not enough spore chains are produced to characterize the spore chain morphology. Mycelium sometimes forms thickened fasciculate elements. Spores elongate to cylindrical 0.4–0.5 $\mu$m × 1.0–1.5 $\mu$m. Spore surface smooth as determined by transmission electron microscopy at 20,000X.

Diagnosis

The general lack of aerial growth of culture BL869 on most media prevents the determination of such essential taxonomic criteria as *en masse* spore coloration and morphology of spore chains. The finding of L-diaminopimelic acid in the analysis of cell walls, however, places the organism in the genus *Streptomyces*. In view of the lack of adequate criteria for the characterization of *Streptomyces* to the species level, no attempt has been made to make this determination. Therefore, culture BL869 will be considered an undetermined species of *Streptomyces* until such a diagnosis is feasible.

TABLE I

Cultural Characteristics of Streptomyces sp. NRRL 5750

Incubation 14 days — Temperature 28°C.

| MEDIUM | AMOUNT OF GROWTH | AERIAL MYCELIUM AND/OR SPORES | SOLUBLE PIGMENTS | REVERSE COLOR | REMARKS |
|---|---|---|---|---|---|
| Yeast extract agar | Moderate | No serial mycelium or spores | Yellowish brown; moderate | Chestnut brown (4ni) | Surface lightly wrinkled |
| Hickey and Tresner's agar | Good | Trace of grayish-white aerial mycelium | Brownish; heavy | Chestnut brown (4ni) | Surface lightly wrinkled |
| Asparagine Dextrose agar | Moderate | Trace of grayish-white aerial mycelium | Yellowish brown; light | Chestnut brown (4ni) | |
| Bennett's agar | Moderate | No aerial mycelium or spores | Yellowish brown; light | Chestnut brown (4ni) | Surface lightly wrinkled |
| Inorganic salts-starch agar | Moderate | Trace of grayish-white aerial mycelium | Yellowish; light | Yellowish | |
| Kuster's oat-flake agar | Moderate | No aerial mycelium or spores | Brownish; heavy | Chestnut brown (4ni) | |
| Czapek's Solution agar | Light | No aerial mycelium or spores | None | Whitish | |
| Potato-dextrose agar | Good | Trace of whitish aerial mycelium | Yellowish brown moderate | Chocolate brown (5po) | Surface lightly wrinkled |

TABLE I

Cultural Characteristics of Streptomyces sp. NRRL 5750

Incubation 14 days　　　　　　　　　　　　　　　Temperature 28°C.

| MEDIUM | AMOUNT OF GROWTH | AERIAL MYCELIUM AND/OR SPORES | SOLUBLE PIGMENTS | REVERSE COLOR | REMARKS |
|---|---|---|---|---|---|
| Tomato Paste-Oatmeal agar | Good | Trace of whitish aerial mycelium | Brownish; heavy | Chocolate brown (5po) | Surface with deep fissures |
| Benedict's agar | Good | Trace of whitish aerial mycelium | Brownish; Chestnut brown moderate | (4ni) | |
| Weinstein's agar | Good | Trace of whitish aerial mycelium | Brownish; heavy | Deep Brown Mahogany (6pl) | Surface finely wrinkled |
| Pablum agar | Very good | Trace of whitish aerial mycelium | Yellowish brown; moderate | Chestnut brown (4ni) | Surface with deep fissures |

TABLE II

Micromorphology of Streptomyces sp. NRRL 5750

| MEDIUM | AERIAL MYCELIUM AND/OR SPORIFEROUS STRUCTURES | SPORE SHAPE | SPORE SIZE | SPORE SURFACE |
|---|---|---|---|---|
| Asparagine Dextrose agar | Aerial mycelium sparse, giving rise to an occasional spore chain. Not enough spore chain to characterize the spore chain morphology. Mycelium sometimes forms thickened fascicle-like elements. | Elongate to cylindrical | 0.4-0.5 um x 1.0-1.5 um | Smooth as determined by transmission electron microscopy at 20,000X |

TABLE III

Micellaneous Physiological Reaction of Streptomyces sp. NRRL 5750 - Temperature 28°C.

| | INCUBATION PERIOD | AMOUNT OF GROWTH | PHYSIOLOGICAL REACTION |
|---|---|---|---|
| Gelatin | 7 days | Good | Complete liquefaction |
| Organic Nitrate Broth | 7 days | Good | Reduced nitrates to nitrites |
| Purple Milk | 7 days | Good | Complete peptonization: no curd |
| Peptone-Iron | 24-48 hours | Good | No melanin pigments produced |
| Yeast extract agar plus (4, 7, 10 and 13%) NaCl | 7 days | Moderate | NaCl tolerance $\geq 10\%$ but $< 13\%$ |
| Cell Wall Analysis | L-Diaminopimelic Acid present. | | |

TABLE IV

Carbon Source Utilization Pattern of Streptomyces sp. NRRL 5750

Incubation 14 days　　　Temperature 28°C.

| CARBON SOURCE | UTILIZATION* |
|---|---|
| l-Arabinose | 3 |
| d-Galactose | 3 |
| d-Fructose | 3 |
| i-Inositol | 3 |
| Lactose | 3 |
| d-Mannitol | 3 |
| d-Melezitose | 0 |
| d-Melibiose | 3 |
| d-Raffinose | 3 |
| l-Rhamnose | 0 |
| Salicin | 3 |
| Sucrose | 0 |
| d-Trehalose | 3 |
| d-Xylose | 3 |
| Dextrose | 3 |
| Negative Control | 0 |

*3 — Good Utilization
2 — Fair Utilization
1 — Poor Utilization
0 — No Utilization It is to be understood that for the production of the new antibiotic, the present invention is not limited to this particular microorganism or to microorganisms fully answering the above growth and microscopic characteristics which are given for illustrative purposes. In fact, it is desired and intended to include the use of mutants produced from the described microorganisms by various means such as exposure to X-radiation, ultraviolet radiation, nitrogen mustard, actinophages, and the like.

Fermentation Process

Cultivation of the microorganism Streptomyces sp. NRRL 5750 may be carried out in a wide variety of liquid culture media. Media which are useful for the production of this novel antibiotic include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcium, sulfate, phosphate, chloride, etc. Trace elements such as boron, molybdenum, copper, etc.; are supplied as impurities of other constituents of the media. Aeration in tanks and bottles is provided by forcing sterile air through or onto the surface of the fermenting medium. Further agitation in tanks is provided by a mechanical impeller. An antifoaming agent, such as lard oil, may be added as needed.

Inoculum Preparation

Shaker flask inoculum of *Streptomyces sp.* NRRL 5750 is prepared by inoculating 100 ml. of sterile liquid medium in 500 ml. flasks with scrapings or washings of spores from an agar slant of the culture. The following is an example of a suitable medium:

| | |
|---|---|
| Molasses | 20 gm. |
| Glucose | 10 gm. |
| Beef Extract | 10 gm. |
| Water to | 1000 ml. |
| Adjust medium pH to 6.2 with NaOH | |

The flasks are incubated at a temperature of 25°–29°C., preferably 28°C., and agitated vigorously on a rotary shaker for 30 to 48 hours. These 100 ml. portions of inoculum are used to inoculate 1 liter and 12 liter batches of the same medium in 2 liter and 20 liter glass fermentors. The inoculated mash is aerated with sterile air while growth is continued for 30 to 48 hours. These batches of inoculum are used to inoculate tank fermentors.

Tank Fermentation

For the production of the antibiotic BL869$\beta$ in tank fermentors the following medium is preferably used:

| | |
|---|---|
| Corn steep liquor | 25 gm. |
| Glucose | 30 gm. |
| $(NH_4)_2SO_4$ | 3.3 gm. |
| Calcium carbonate | 9 gm. |
| Water to | 1000 ml. |

Each tank is inoculated with 3 to 10% of inoculum made as described above. Aeration is supplied at the rate of 0.5–1.0 liter of sterile air per liter of broth per minute and the fermenting mixture is agitated by an impeller driven at 200–400 r,p,m, The temperature is maintained at 25°–29°C., usually at 28°C. The fermentation is ordinarily continued for 65–90 hours, at which time the mash is harvested.

Isolation of Antibiotic BL869$\beta$

After the fermentation is completed, the fermented mash containing BL869$\beta$ is filtered. The filtrate is treated with sodium fluoride (0.2%) at pH 6.5, stirred for 1 hour and then filtered. The filtrate is percolated at pH 6.5 through 5 liters of Amberlite IRC–50 (Na$^+$) contained in a 4 × 36 column with a flow rate of about 270 ml./minute. The column is washed with 30 liters of distilled water and water-wash effluent is discarded. Elution of the adsorbed antibiotic activity is carried out with 72 liters of 0.3N sulfuric acid in 10% aqueous acetone. Active fractions are combined and the pH adjusted to 5.0 with sodium hydroxide. The acetone is removed in a still. The remaining 53 liters are adjusted to pH 6.8. To these 53 liters are added 5.3 liters of ethyl acetate and 530 ml. of bis-(2-ethylhexyl)phsophate followed by pH adjustment to 8.0 with sodium hydroxide. The ethyl acetate phase is separated and treated with 12 liters of distilled water. The pH is adjusted to 2.0 with sulfuric acid. The aqueous phase is separated and adjusted to about pH 5 with solid barium hydroxide. The mixture is filtered and the residual ethyl acetate is removed. The remaining concentrate (about 4 liters) contains BL869$\beta$. This concentrate is passed very slowly through an Amberlite XAD-2 column (2 × 20 inches) at neutral pH. The column is washed with water.

The Amberlite XAD–2 column is then eluted with methanol containing 0.2% acetic acid. After concentration, the aqueous residue is freeze dried yielding BL869$\beta$ of about 20% purity. This product is dissolved in a minimum amount of water and adborbed onto a 1 ½ × 18 inch column of carboxymethyl cellulose in the sodium form (pH 6 ). The column is washed with distilled water until the eluate is essentially colorless. Elution with 5% sodium chloride provides the activity in a volume of 750 ml. as monitored by U.V. at 320 m$\mu$. This eluate is adjusted to pH 7 with 5N sodium hydroxide. A 25 ml. portion of bis-(2-ethylhexyl)-phosphate is added and the pH readjusted to 7.2. One liter of ethyl acetate is added and the phases are mixed with the aid of an air stirrer. The organic layer is then separated and stirred with 500 ml. of water and the pH is adjusted to 2.5 with 18N sulfuric acid. The aqueous layer is neutralized to pH 6.5 with solid barium hydroxide. Filtration and freeze drying yield BL869$\beta$ of about 15% purity. Extraction of this material with methanol by stirring overnight at room temperature yields, after removal of the solvent, solid BL869$\beta$ of about 60% purity. This BL869$\beta$ is dissolved in a small amount of the lower phase of the system n-butanol-methanol-acetic acid-water (160–12–2–120) and adsorbed on the top of a 200 gm. Whatman cellulose powder (grade CF 11) column equilibrated with the bottom phase of the solvent system. The activity is eluted with the upper phase and the active fractions are combined and treated with a large volume of petroleum ether. The aqueous phase is separated and the residual solvent is removed under vacuum. After freeze drying, the product BL869$\beta$ appears as an amorphous buff-colored material of high purity which is very soluble in water and to a lesser extent in methanol.

In vitro Activity

BL869$\beta$ is active in vitro against a variety of gram positive and gram negative bacteria when tested by the standard agar dilution streak plate procedure. The results of such a test appear in Table V and are reported as minimal inhibitory concentrations (MIC) in mcg./ml.

TABLE V

| Organism Identification | Number of Clinical Cultures Tested | MIC (mcg./ml.) Median and Range |
|---|---|---|
| *Escherichia coli* | 6 | 8 (8–16) |
| *Enterobacter aerogenes* | 6 | 8 (8–16) |
| *Proteus* | 6 | 16 (8–64) |
| *Shigella* | 6 | 8 |
| *Salmonella* | 6 | 64 (8–128) |
| *Serratia* | 4 | 32 (32–64) |
| *Herellea* | 4 | 128 |
| *Pseudomonas* | 4 | >128 |
| *Staphylococcus* | 5 | 8 (8–32) |
| *Enterococcus* | 5 | 16 |

In vivo Activity

The compound BL869$\beta$ is active in vivo against a variety of organisms. This new antibacterial is thereby potentially useful as a therapeutic agent in treating bacterial infections in mammals. This new antibacterial can be expected to be usefully employed for treating or controlling bacterial infections by parenteral administration.

The usefulness of this new antibacterial agent is demonstrated by its ability to control systemic lethal infections in mice. BL869$\beta$ shows in vivo antibacterial activity in mice against *Escherichia coli, Proteus mirabilis, Salmonella typhosa, Herellea* Species No. 10, *Staphylococcus aureus* Strain Smith, *Staphylococcus aureus* Strain Rose, *Streptococcus pyogenes* and *Diplococcus*

*pneumoniae* when administered by a single 0.5 ml. subcutaneous dose suspended in 0.2% aqueous agar to groups of Carworth Farms CF-1 mice, weighing about 20 gm., infected intraperitoneally with a lethal dose of these bacteria in $10^{-3}$, $10^{-1.6}$, undiluted, $10^{-5}$, $10^{-2}$, $10^{-0.5}$, $10^{-5}$ and $10^{-6}$ trypticase soy broth (TSP) dilutions, respectively, of a 5 hour TSP blood culture. Table VI illustrates the *in vivo* activity of BL869β against these bacteria.

TABLE VI

| Single subcutaneous Dose mg./kg. | Alive/Total Mice Tested 7 Days After Injection |
|---|---|
| | *Escherichia coli* No. 311 |
| 128 | 10/10 |
| 64 | 9/10 |
| 32 | 19/20 |
| 16 | 8/10 |
| 8 | 2/10 |
| 4 | 1/10 |
| 2 | 0/10 |
| Infected non-treated controls | 39/40 Mice died within 2 days after infection |
| | *Proteus mirabilis* No. 4671 |
| 128 | 13/20 |
| 64 | 9/20 |
| 32 | 1/20 |
| 16 | 0/20 |
| 8 | 0/10 |
| Infected non-treated controls | 40/40 Mice died within 2 days after infection |
| | *Salmonella typhosa* 6539 |
| 64 | 8/20 |
| 32 | 10/20 |
| 16 | 15/20 |
| 8 | 3/20 |
| 4 | 1/10 |
| Infected non-treated controls | 37/40 Mice died within 2 days after infection |
| | *Herellea Species* No. 10 |
| 64 | 13/20 |
| 32 | 8/20 |
| 16 | 0/20 |
| 8 | 0/20 |
| Infected non-treated controls | 48/50 Mice died within 2 days after infection |
| | *Staphylococcus aureus* Strain Smith |
| 64 | 20/20 |
| 32 | 20/20 |
| 16 | 7/20 |
| 8 | 0/20 |
| Infected non-treated controls | 38/40 Mice died within 2 days after infection |
| | *Staphylococcus aureus* Strain Rose |
| 128 | 18/20 |
| 64 | 10/20 |
| 32 | 1/20 |
| 16 | 1/20 |
| Infected non-treated controls | 36/40 Mice died within 1 day after infection |
| | *Streptococcus pyogenes* C203 |
| 128 | 10/10 |
| 64 | 20/20 |
| 32 | 20/20 |
| 16 | 5/20 |
| 8 | 1/20 |
| Infected non-treated controls | 40/40 Mice died within 2 days after infection |
| | *Diplococcus pneumoniae* SVI |
| 128 | 9/10 |
| 64 | 20/20 |
| 32 | 20/20 |
| 16 | 9/20 |
| 8 | 0/20 |
| 4 | 0/20 |
| Infected non-treated controls | 40/40 Mice died within 2 days after infection |

The invention will be described in detail in conjunction with the following specific examples:

EXAMPLE 1

Inoculum Preparation

A typical sterile medium used to grow the primary inoculum was prepared according to the following formula:

| | |
|---|---|
| Molasses | 20 gm. |
| Glucose | 10 gm. |
| Beef Extract | 10 gm. |
| Water to | 1000 ml. |

The washed or scraped spores from an agar slant of *Streptomyces sp.* NRRL 5750 were used to inoculate two 500 ml. flasks each containing 100 ml. of the above sterile medium, which had been adjusted to pH 6.2 with sodium hydroxide. The flasks were placed on a rotary shaker and agitated vigorously for 48 hours at 28°C. The resulting flask inoculum was transferred to a 20 liter glass fermentor containing 12 liters of the same sterile medium. The inoculum mash was aerated with sterile air while growth was carried out for about 48 hours, after which the contents were used to seed a 300 liter tank fermentor.

EXAMPLE 2

Fermentation

A fermentation medium was prepared according to the following formula:

| | |
|---|---|
| Corn steep liquor | 25 gm. |
| Glucose | 30 gm. |
| Ammonium sulfate | 3.3 gm. |
| Calcium carbonate | 9 gm. |
| Water to | 1000 ml. |

The fermentation medium was sterilized at 120°C. with steam at 20 pounds pressure for 60 minutes. The pH of the medium after sterilization was 6.4. Three hundred liters of sterile medium in a 400 liter tank fermentor was inoculated with 12 liters of inoculum such as described in Example 1. The fermentation was carried out at 28°C. using Hodag LG-8 oil as a defoaming agent. Aeration was supplied at the rate of 0.5 liter of sterile air per liter of mash per minute. The mash was agitated by an impeller driven at 250 r.p.m. At the end of approximately 90 hours of fermentation time the mash was harvested.

EXAMPLE 3

Isolation of BL869β

The fermentation broth, prepared as described in Example 2, and having a volume of 265 liters, was treated with sodium fluoride (0.2%) at pH 6.5, stirred for about 1 hour, and then the precipitate was filtered off with the aid of 1% Hyflo Super-cel.

This filtrate was percolated, at pH 6.5, through 5 liters of Amberlite IRC-50 (a methacrylic acid-divinyl benzene ion exchange resin) (Na⁺) contained in a 4 × 36 inch column with a flow rate of 270 ml./minute. The column was washed with 30 liters of distilled water and the water-wash effluent was discarded. Elution of the adsorbed antibiotic activity was carried out with 72 liters of 0.3N sulfuric acid in 10% aqueous acetone. Active fractions were combined and the pH adjusted to 5.0 with sodium hydroxide. The acetone was removed in a still. The remaining 53 liters were adjusted to pH 6.8. To this was added 5.3 liters of ethyl acetate and 530 ml. of bis-(2-ethylhexyl)phosphate followed by pH adjustment to 8.0 with sodium hydroxide. The ethyl acetate phase was separated and treated with 12 liters of distilled water and the pH was adjusted to 2.0 with sulfuric acid. The aqueous phase was separated and neutralized to about pH 5 with solid barium hydroxide. The mixture was filtered and the residual ethyl acetate was removed leaving 4 liters of concentrate containing BL869β. This material was passed very slowly through an Amberlite XAD-2 (a polystyrene absorbent) column (2 × 20 inches) at neutral pH and washed with water. The Amberlite XAD-2 column was then eluted with methanol containing 0.2% acetic acid. After concentration, the aqueous residue was freeze dried to give 7.5 gm. of crude BL679β (20% purity). The BL869β was dissolved in a minimum volume of water and adsorbed onto a 1 ½ × 18 inch column of carboxymethyl cellulose in the sodium form (pH 6). The column was washed with distilled water until the eluate was essentially colorless. Elution with 5% sodium chloride solution provided the activity in a volume of 750 ml. as monitored by ultraviolet at 320 mμ. This eluate was adjusted to pH 7 with 5N sodium hydroxide. Twenty-five ml. of bis-(2-ethylhexyl)phosphate was added and the pH readjusted to 7.2. One liter of ethyl acetate was added and the phases were mixed with the aid of an air stirrer. The organic layer was then separated and stirred with 500 ml. of water and the pH was adjusted to 2.5 with 18N sulfuric acid. The aqueous layer was neutralized to pH 6.5 with solid barium hydroxide. This mixture was filtered and the filtrate was freeze dried yielding 4.5 gm. of BL869β of 15% purity. This product was extracted with 200 ml. of methanol by stirring overnight at room temperature. The solvent was removed yielding BL869β of 60% purity.

EXAMPLE 4

Purification of BL869β

A 2.6 gm. portion of BL869β of about 60% purity, was dissolved in a small amount of the lower phase of the system n-butanol:methanol:acetic acid:water (160:12:2:120) and adsorbed on the top of a 200 gm. Whatman (grade CF 11) cellulose powder column equilibrated with the bottom phase of the solvent system. The activity was eluted with the upper phase and the active fractions were combined and treated with 500 ml. petroleum ether (30°-60°C.). The aqueous phase was separated and the residual solvent removed under vacuum. The product was freeze dried yielding 1 gm. of BL869β as an amorphous buff-colored product. The partition column procedure was repeated yielding BL869β with the following characteristics for the hydrochloride salt:

Elemental Analysis: C, 40.94; H, 5.42; N, 23.54; O, 11.63; Cl, 16.07.

Specific Rotation: $[\alpha]_D^{25°} = +11.1°$ (C=0.351 in methanol).

Ultraviolet Absorption: $\lambda_{max.}^{CH_3OH}$ 235 and 323 mμ ($\epsilon_{1cm}^{1\%}$ 350 and 640).

Figure 2:
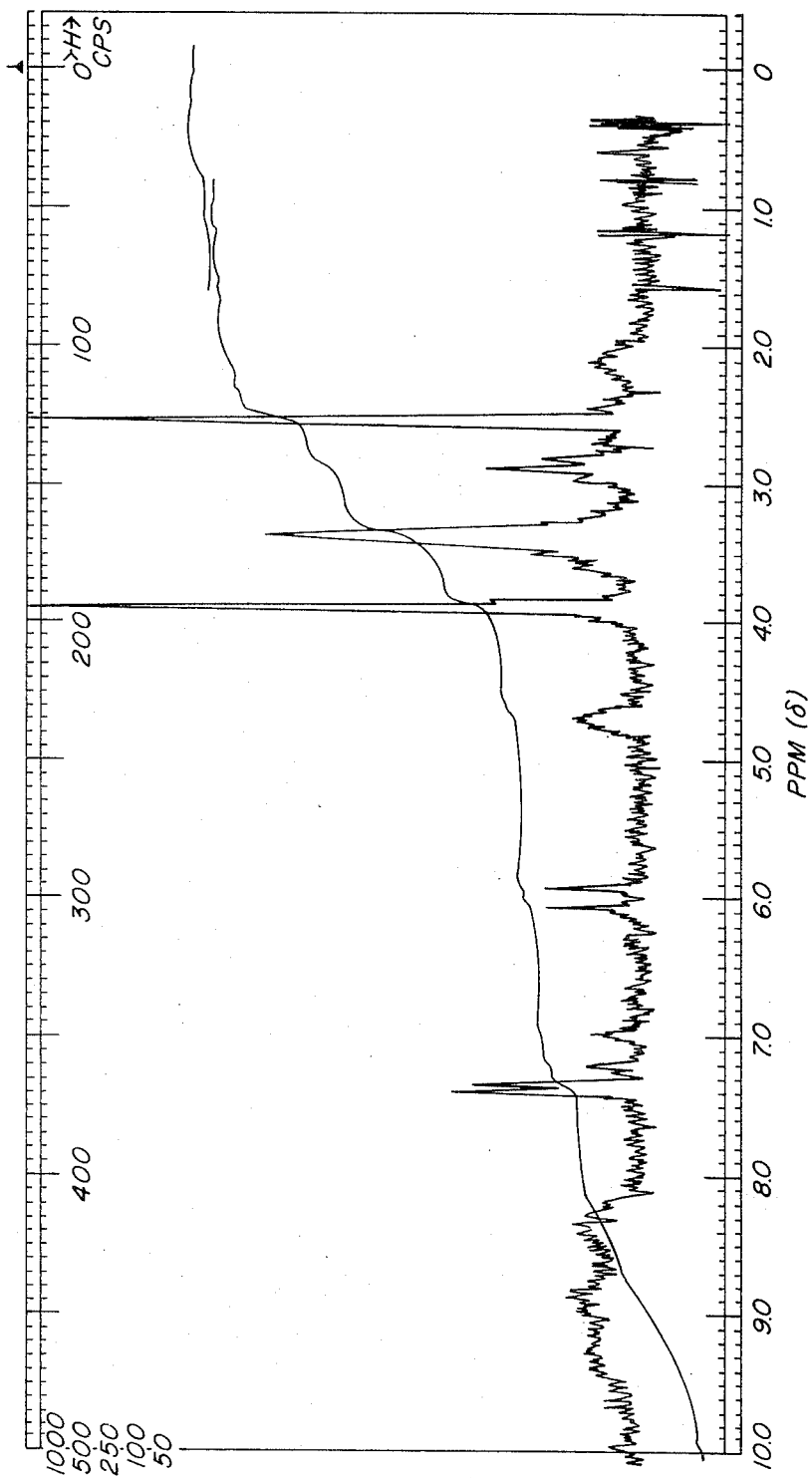

A standard infrared absorption spectrum of BL869β hydrochloride prepared in a KBr disc is shown in FIG. 1 of the accompanying drawings. A standard nuclear magnetic resonance spectrum of BL869β hydrochloride prepared in deuterated dimethylsulfoxide is shown in FIG. 2 of the accompanying drawings.

We claim:

1. Antibiotic BL869β hydrochloride, a compound which
   a. is effective in inhibiting the growth of bacteria; and in its essentially pure crystalline form
   b. has an optical rotation $[\alpha]_D^{25°} =+11.1°$ (C=0.351 in methanol);
   c. has the following elemental analysis (percent): C, 40.94; H, 5.42; N, 23.54; O, 11.63; Cl, 16.07;
   d. has ultraviolet absorption maxima $\lambda_{max.}^{CH_3OH}$ 235 and 323 mμ ($\gamma_{1\ cm.}^{1\%}$ 350 and 640);
   e. has a characteristic infrared absorption spectrum as shown in FIG. 1 of the drawings; and
   f. has a characteristic proton magnetic resonance spectrum as shown in FIG. 2 of the drawings.

2. A compound as defined in claim 1, antibiotic BL869β hydrochloride, in its essentially pure form.

3. A process for the production of antibiotic BL869β hydrochloride which comprises cultivating *Streptomyces sp.* NRRL 5750 in an aqueous nutrient medium containing assimilable sources of carbohydrate, nitrogen, and inorganic salts under submerged aerobic conditions until substantial antibacterial activity is imparted to said medium, and then recovering antibiotic BL869β hydrochloride therefrom.

* * * * *